UNITED STATES PATENT OFFICE.

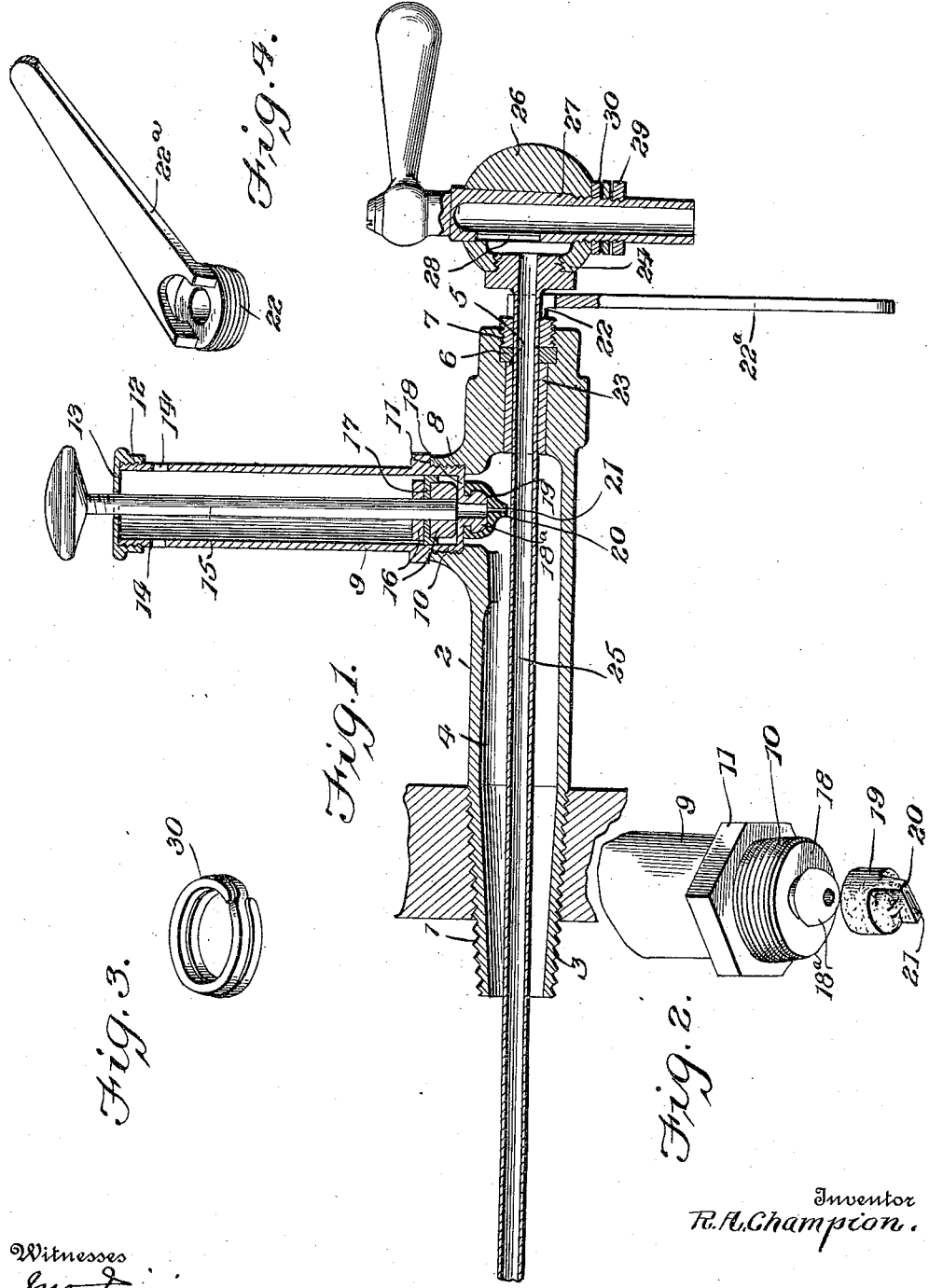

ROADY A. CHAMPION, OF DENISON, IOWA.

BEER-FAUCET.

1,162,035.   Specification of Letters Patent.   Patented Nov. 30, 1915.

Application filed April 28, 1914.  Serial No. 834,989.

*To all whom it may concern:*

Be it known that I, ROADY A. CHAMPION, citizen of the United States, residing at Denison, in the county of Crawford and State of Iowa, have invented certain new and useful Improvements in Beer-Faucets, of which the following is a specification.

My invention relates to faucets, and particularly to that class of faucets used for drawing beer or other liquids wherein air is forced into the upper portion of the barrel or cask containing the liquid to be delivered so as to force the liquid out through the faucet.

The primary object of my invention is to improve upon the beer faucet disclosed in my Patent, No. 1,051,554, granted to me on January 28, 1913.

A further object of the invention is to provide a faucet of this character having such a construction that all of the parts of the faucet may be readily disassembled and the faucet thoroughly cleaned, and in this connection to so construct the faucet that the longitudinal bore through the faucet shall continue from end to end, that the pump barrel shall be bodily removable from the faucet, and that the controlling valve for the faucet shall also be bodily removable.

Still another object of the invention is to provide for the relatively easy entrance of air into the barrel when the beer or other liquid is being drawn off, and to this end to provide an outlet pipe which projects beyond the end of the body of the faucet and is disposed concentrically to the bore of the body of the faucet so as to provide for the passage of air around the outlet pipe, this air entering the barrel at a point separated from the point where the beer or other liquid enters the outlet pipe.

Other objects will appear in the course of the following description.

My invention is illustrated in the accompanying drawings, wherein:

Figure 1 is a longitudinal section of a faucet constructed in accordance with my invention. Fig. 2 is a perspective detail view of the lower end of the air compressing cylinder with the valve cap detached therefrom. Fig. 3 is a perspective view of the washer used on the valve or cock. Fig. 4 is a perspective view of the gland nut.

Corresponding and like parts are referred to in the following description and indicated in all the views of the accompanying drawings by the same reference characters.

Referring to the drawings, 2 designates the body of the faucet which is preferably made of metal and which is tapered toward its rear end as at 3, this tapering portion being screw threaded. The body of the faucet is formed with a longitudinal bore 4 which extends from the rear end of the faucet entirely through the body to the front end thereof. Disposed in the forward end of this bore is a seat 5 against which rests a gasket 6. The wall of the bore forward of this gasket is screw threaded as at 7. The body of the faucet intermediate its ends is also formed with the upward extension 8 which is interiorly screw threaded and engaging in the screw threads of this extension is the pump barrel 9, the lower end of which is reduced and screw threaded as at 10, the barrel being formed immediately above this screw threaded portion with the outwardly projecting shoulder 11. The upper end of the barrel 9 is screw threaded at 12 for engagement with a cap 13, and immediately below this cap the wall of the barrel is perforated as at 14.

Operating within the barrel is a piston comprising a piston rod 15, a head 16 and a slightly concavo-convex cup 17 of rubber, leather or other suitable material. The upper end of the piston is of course provided with a handle whereby the piston may be operated. The lower extremity of the barrel is partially closed by a wall 18, this wall being formed with a projecting headed stud 18ª at its center, this stud being perforated. Over the enlarged head of this stud there is placed the valve cap 19 of the same form as that illustrated in my prior patent. This cap is conical at its bottom and is formed with the transverse rib 20 longitudinally slitted as at 21, the resilience of the rubber tending to keep the slit normally closed. Exterior pressure upon the conical bottom of the valve will also tend to keep the slit closed. It will be obvious, however, that upon a descent of the plunger within the barrel, the pressure of the air within the plunger will cause the slit to open and the air to be ejected. It will be seen that the enlarged head 19 engaging as it does within the rubber cap will securely hold this cap upon the lower end of the barrel and yet permit the ready removal of the cap in case it is necessary to replace it by a new one, or in case it is desired to entirely clean the interior of the barrel.

The forward end of the body 2, as before stated, is screw-threaded at 7 and having screw-threaded engagement therewith is a gland-nut 22 to engage the gasket 6 disposed within the bore 4. When this gland-nut is screwed home the gasket will be compressed. The gland-nut is also provided with a handle 22ª whereby it may be operated. Passing longitudinally through the bore of the faucet is a pipe 25 which is longer than the body portion 2 of the faucet, and extends entirely through the bore thereof and out at the rear end. The forward end of the bore 4 is contracted and a sleeve 23 is fitted within the contracted portion of the bore and terminates at its front end about in the plane of the seat 5. This sleeve 23 may be of any material and serves to obtain a close fit between the bore 4 and pipe 25. This pipe extends through the gland-nut 22 and has attached to it or formed with it the head 24. Attached to this head 24 is a globular head 26 preferably of wood or like material, through which passes the tapered hollow valve 27. This valve has a discharge opening at its lower end and a relatively wide inlet opening 28 on one side which is adapted to register with the opening formed at the center of the annular extension 24. The valve as before stated, is tapered and is held in proper position within the head 26 by means of a nut 29 and a washer 30. This washer is preferably of the spring type and therefore may be compressed by turning up the nut 29 so as to prevent any possible leakage and also hold the valve so firmly within the head 26 that it cannot be accidentally turned.

It will be obvious that by rotating the gland-nut 22 the gasket 6 will be compressed and tightened around the pipe 25 thus preventing the escape of any liquid or air. By turning the gland nut in a reverse direction the gasket may be loosened so as to permit the easy withdrawal of the pipe 25 and permit the withdrawal of the gasket also for cleaning or replacement.

The operation of my invention will be obvious to those acquainted with the art. When it is desired to force air into the barrel so as to cause a ready ejection of the liquid therefrom, the pump piston 15 is operated which compresses air and forces it out through the slit 21 and into the annular space surrounding the pipe 25. The air will pass out at the rear end of the body portion of the faucet and into the barrel. If now the tap or valve 27 be turned to a position to discharge liquid from the barrel, it will be obvious that the compressed air will force the liquid into the pipe 25 and out through the tap. It will also be obvious that if the liquid is running slowly, the plunger may be reciprocated while the tap is open without interfering with the proper passage of the liquid through the tap. In my prior construction this is not possible for the reason that the incoming liquid interfered with the outlet passage of the compressed air and caused regurgitation. The liquid, therefore, would not run out smoothly from the tap if the pump plunger were operated.

It will be obvious that all of the parts of this faucet may be readily taken apart for cleansing. Thus the gland nut 22 may be removed and the pipe drawn out of the body 2 of the faucet. The pump barrel 9 may also be readily removed from the body portion of the faucet. Under these circumstances the passage through the faucet is entirely clear and the faucet may be readily cleaned from end to end with no possible chance of any foreign matter collecting within the faucet and not being removed. The pump barrel after its removal may be readily cleansed by taking off the valve cap 19 and also the cap 13. The plunger being removed, the pump barrel is entirely clear from end to end. When the cap is removed it may be readily cleaned or a new cap substituted. By removing the nut 29 and the washer 30, the tap or valve 27 may be removed from the head 26 and this will permit the ready cleansing of the pipe 25 and the interior of the tap.

What I claim is:

A faucet comprising a body having a longitudinal bore extending entirely therethrough, the forward portion of such bore being contracted and the outer end of the contracted portion being enlarged and internally threaded, a sleeve fitted within the contracted portion of the bore, a gasket disposed within the outer enlarged portion of the bore and overlapping the forward end of the sleeve, a gland nut threaded into the outer enlarged portion of the bore, a discharge pipe passing entirely through the body and extending beyond opposite ends thereof and fitting snugly within the said sleeve, gasket and gland nut, a head at the forward end of the discharge pipe having its outer portion reduced and externally threaded, a valve body having a vertical opening and a lateral opening leading from the vertical opening and internally threaded to receive the threaded end of the head at the outer end of the discharge pipe, a tubular valve fitted in the vertical opening of the valve body, a barrel coupled to the faucet body adjacent the contracted portion of the bore thereof, and a piston arranged to operate within the barrel.

In testimony whereof I affix my signature in presence of two witnesses.

ROADY A. CHAMPION. [L. S.]

Witnesses:
G. R. RICHARDSON,
CARL B. RICHARDSON.

Copies of this patent may be obtained for five cents each, by addressing the "Commissioner of Patents, Washington, D. C."